Oct. 25, 1960 R. E. HOLMES, JR 2,957,552
DISK BRAKE
Filed April 2, 1956
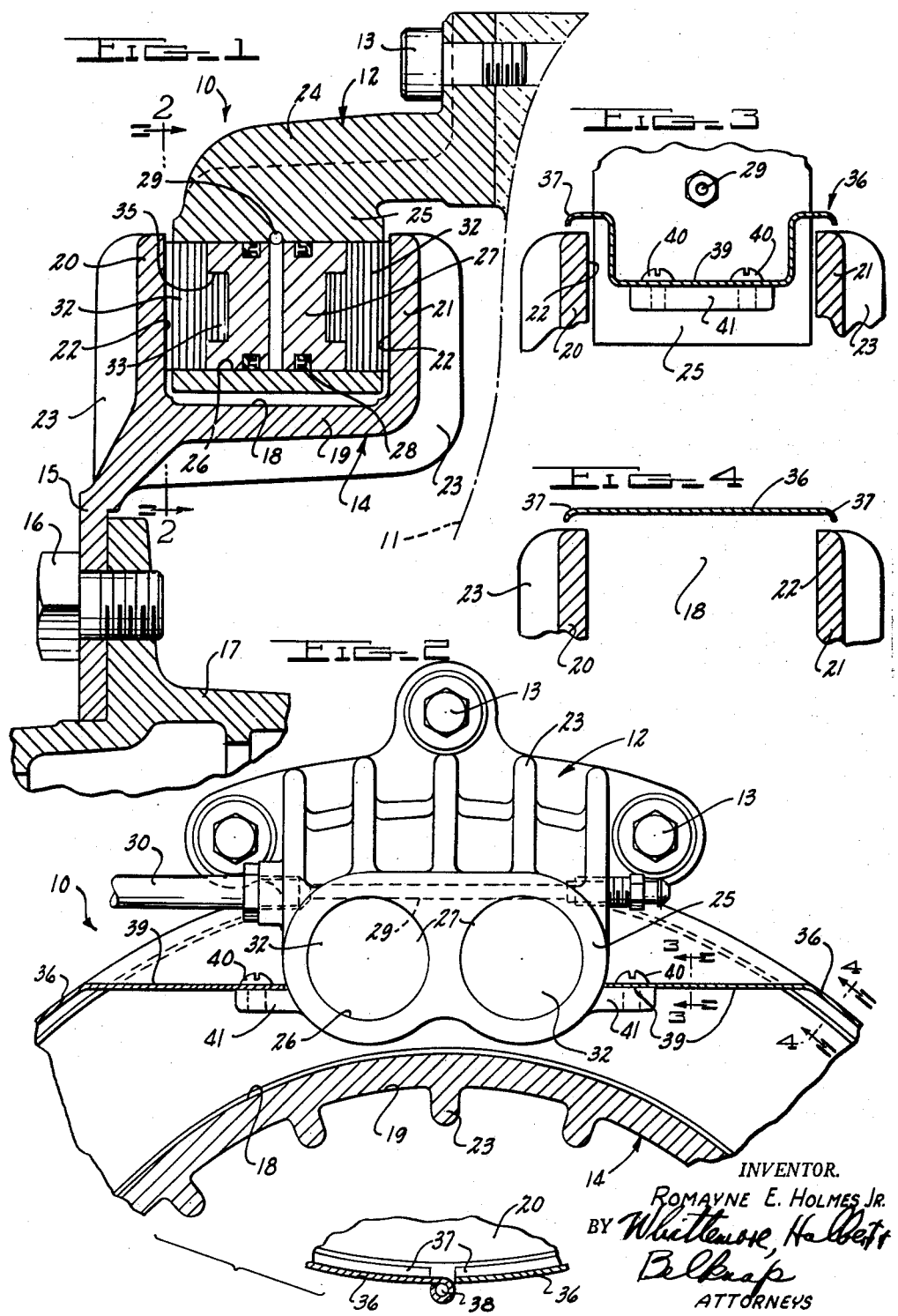
INVENTOR.
ROMAYNE E. HOLMES JR.
BY Whittemore, Hulbert
Belknap
ATTORNEYS United States Patent Office 2,957,552
Patented Oct. 25, 1960

2,957,552
DISK BRAKE

Romayne E. Holmes, Jr., Wyandotte, Mich., assignor to Kelsey-Hayes Company, a corporation of Delaware Filed Apr. 2, 1956, Ser. No. 575,533
2 Claims. (Cl. 188—73)

The present invention relates to improvements in a disk brake for automotive and like vehicles which is of compact and inexpensive construction, yet has excellent braking capacity in relation to its size.

It is a general object of the invention to provide a disk brake characterized by a brake drum having a radially outwardly exposed, circumferential braking channel receiving one or more friction brake devices, which act against opposed, axially spaced and radially extending inner disk surfaces of the channel. This arrangement provides an extremely compact and very rugged brake unit.

More specifically it is an object of the invention, in a preferred form thereof, to provide a disk brake as described in which the frictional device received in the disk channel comprises oppositely acting members having friction buttons or like friction elements thereon for braking engagement with the spaced radial disk surfaces.

Yet another specific object of the invention is to provide a disk brake of the above character in which the disk drum is heavily finned on its external area for heat dissipation, as well as to strengthen and rigidify the drum.

Another object is to provide a disk brake characterized by an outwardly opening channel, as described, in which novel provisions are made to encase and shield the channel about its outwardly exposed periphery from dirt and foreign matter.

The foregoing as well as other objects will be made more apparent as this description proceeds, especially when considered in connection with the accompanying drawings, wherein:

Fig. 1 is a fragmentary view in axial section through a portion of a disk brake in accordance with the invention;

Fig. 2 is a fragmentary view in transverse vertical section along line 2—2 of Fig. 1; and Figs. 3 and 4 are, respectively, fragmentary views in section along lines 3—3 and 4—4 of Fig. 2.

As illustrated in Fig. 1, the disk brake of the invention, generally designated 10, is shown as being operatively mounted to an axle spindle member 11, on which a fixed brake cylinder bracket 12 of the brake 10 is appropriately secured by bolts or studs 13. Bracket 12 slidably supports movable brake members to be described. An annular rotating drum 14 of the brake has a radially inwardly extending annular flange 15 secured by bolts or studs 16 to a hub 17 or like mounting member of a wheel, this wheel being operatively associated with the spindle member 11 in an entirely conventional manner.

The disk drum 14 of brake 10 is formed to provide an outer circumferential, radially outwardly exposed brake channel 18 about its periphery. The channel is defined between an axially extending portion 19 of the drum 14 and a pair of radially extending disk flanges or walls 20, 21 integral with the portion 19. These walls have smooth, mutually facing brake disk surfaces 22 on their inner sides which are in parallel, axially spaced radial planes. The drum 14 is formed on its outwardly exposed surface to provide heat dissipating fins 23 in appropriate circumferential spacing thereabout. Fins 23 have considerable area of exposed surface and serve to rigidify the drum 14 as a whole in addition to their heat dissipative action.

The brake cylinder bracket 12 is of an integral, one-piece construction. It extends axially outwardly from its bolted connection to the axle spindle member 11 and is provided with external heat dissipative and rigidifying fins 24 in this axially extending portion. Bracket 12 has a radially inwardly extending plunger housing or cylinder portion 25 formed integrally thereon which is received within the brake channel 18 of the drum. The construction is sufficiently massive to withstand the braking torque transmitted thereto in operation. Bracket portion 25 is bored to provide a pair of laterally spaced, axially extending cylinders 26 whose axes are at a common radial distance from the axis of rotation of drum 14, as shown in Fig. 2, and oppositely acting hydraulic piston or plunger elements 27 are received in each of the cylinders 26, on either side of the axial center thereof. Appropriate annular seals 28 are applied to the plungers, and the bracket housing 25 is provided with a hydraulic pressure bore 29 opening to each of the cylinders 26 at its axial mid-point, i.e., between adjacent inner ends of the plungers 27. This bore is suitably communicated at one end thereof with a hydraulic pressure line or conduit 30 (Fig. 2), which is appropriately controlled manually or pedally to apply brake actuating hydraulic pressure as desired.

Each of the plunger elements 27 is equipped on its axially outer face with an appropriate friction brake button or disk 32 fabricated in circular outline and of a suitable non-metallic friction material, treated as desired. A reduced inner end portion 33 of each disk 32 is received and piloted in a circular recess 35 on the outer face of the associated plunger 27. Under hydraulic pressurization of the cylinders 26 in their spaces between the plunger elements 27, the plungers and friction disks 32 are thrust oppositely into braking engagement with the surfaces 22 of the radial disk flanges 20, 21 of the drum 14.

The invention incorporates a novel and improved dirt shield for the outwardly exposed braking channel and hydraulically actuated structure described above. This shield is in the form of a pair of like sheet metal shells 36 of approximately semi-circular outline and of an axial width, as shown in Figs. 3 and 4, sufficient to bridge across the outwardly exposed brake channel 18, being provided with continuous, radially inturned lips 37 along their opposing circumferential edges which extend closely adjacent the outer peripheries of the radial disk flanges 20, 21, of drum 14. Throughout the major portion of their circumferential extent the shells 36 are flat across their axially extending width, as shown in Fig. 4, and they are jointed to one another in a zone diametrically opposite the brake mounting bracket 12, as by a suitable hinge pin 38. In this connection, the hinging connection at 38 may be one flexibly articulating two separate shell sections, or the latter may be integrally joined at a wrap-around at the hinge pin 38, or otherwise. The function of the connection is simply to permit a sufficient spreading of the shell members 36 to enable them to be slipped over the drum 14 and held in the operative position shown in Figs. 2, 3 and 4.

For the purpose of rigidly securing the shield in this position, the shell members 36 are formed at their upper ends adjacent the bracket 12 with radially inwardly offset sections at 39 which extend between the disk friction surfaces 22 and are secured by small screws 40 to a pair of outwardly projecting lugs 41 integral with the bracket plunger housing 25. This connection is a readily releasable one, enabling the shield to be removed for servicing, inspection, etc.

The disk brake of the invention is an exceedingly compact and inexpensively produced one, and it is devised for ready installation and servicing on various types of wheel structures. Its braking capacity under practical braking pressures available in automotive and like installations is very great in relation to its size; and the brake is thus very well suited, particularly in regard to its limited space requirements, to the trend towards smaller wheel diameters and resultant diminished overall car height.

What I claim as my invention is:

1. A disk brake comprising a rotatable drum formed to provide a radially outwardly opening circumferentially extending annular generally U-shaped channel defined by an axially extending portion and axially spaced portions fixed to and extending radially outwardly from said axially extending portion, said spaced portions having generally radial confronting disk brake surfaces, said drum having a flange extending radially inwardly from said channel for attachment to a rotary member such as a wheel, a braking device received in said channel and covering only a minor portion of the circumferential extent thereof, said braking device comprising oppositely acting friction elements movable away from each other into engagement with said respective disk brake surfaces, means for thus moving said friction elements, an external arcuate dust guard in the form of an elongated metal strip extending along the remaining major portion of the circumferential extent of said channel and bridging the space between said spaced portions at the radially outer extremities thereof, the opposite longitudinal edges of said strip being disposed in closely spaced relation to the radially outer extremities of said spaced portions to define a pair of air inlets opening into said channel and extending continuously along said remaining major portion of the circumferential extent of said channel, said air inlets providing for the admission of outside air into said channel to cool said brake surfaces, and means for mounting said dust guard strip in fixed position with respect to said braking device.

2. A disk brake comprising a rotatable drum formed to provide a radially outwardly opening circumferentially extending annular generally U-shaped channel defined by an axially extending portion and axially spaced portions fixed to and extending radially outwardly from said axially extending portion, said spaced portions having generally radial confronting disk brake surfaces, said drum having a flange extending radially inwardly from said channel for attachment to a rotary member such as a wheel, a braking device received in said channel and covering only a minor portion of the circumferential extent thereof, said braking device comprising oppositely acting friction elements movable away from each other into engagement with said respective disk brake surfaces, means for thus moving said friction elements, an external arcuate dust guard in the form of an elongated metal strip extending along the remaining major portion of the circumferential extent of said channel and bridging the space between said spaced portions at the radially outer extremities thereof, the opposite longitudinal edges of said strip being radially inturned and disposed in closely spaced overlying relation to the radially outer extremities of said spaced portions to define a pair of lateral air inlets opening into said channel and extending continuously along said remaining major portion of the circumferential extent of said channel, said air inlets providing for the admission of outside air into said channel to cool said brake surfaces, said dust guard strip comprising elongated arcuate sections having their adjacent ends hinged together, and means for releasably securing the opposite ends of said arcuate sections to said braking device.

References Cited in the file of this patent

UNITED STATES PATENTS

| | | |
|---|---|---|
| 1,048,894 | Schickel | Dec. 31, 1912 |
| 1,900,282 | Halbach | Mar. 7, 1933 |
| 2,135,568 | Durham et al. | Nov. 8, 1938 |
| 2,174,396 | McCune | Sept. 26, 1939 |
| 2,174,400 | McCune | Sept. 26, 1939 |
| 2,251,539 | Ash | Aug. 5, 1941 |
| 2,311,529 | Freer | Feb. 16, 1943 |
| 2,687,786 | Kelley | Aug. 31, 1954 |
| 2,746,577 | Butler | May 22, 1956 |
| 2,762,460 | Butler | Sept. 11, 1956 |
| 2,837,178 | Burnett | June 3, 1958 |
| 2,848,072 | Stacy | Aug. 19, 1958 |

FOREIGN PATENTS

| | | |
|---|---|---|
| 1,107,778 | France | Jan. 5, 1956 |
| 706,789 | Great Britain | Apr. 7, 1954 |